Aug. 12, 1947.     J. D. RYAN ET AL     2,425,568
LAMINATED SAFETY GLASS
Filed March 21, 1942
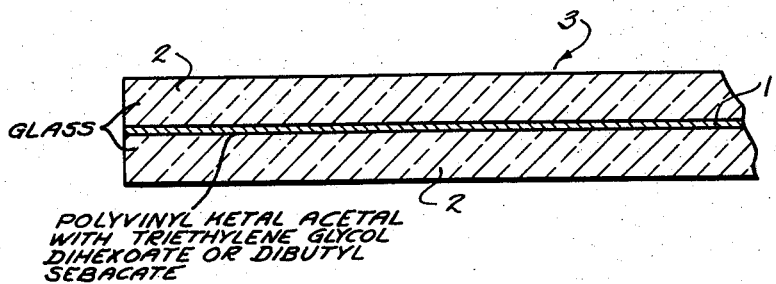
Inventor
JOSEPH D. RYAN
FRED B. SHAW JR.
By
Frank Fraser
Attorney Patented Aug. 12, 1947

2,425,568

UNITED STATES PATENT OFFICE 2,425,568

LAMINATED SAFETY GLASS

Joseph D. Ryan, Toledo, Ohio, and Fred B. Shaw, Jr., Baltimore, Md., assignors to Libbey-Owens-Ford Glass Company, Toledo, Ohio, a corporation of Ohio Application March 21, 1942, Serial No. 435,714

8 Claims. (Cl. 154—2.77)

Our invention relates to the art of laminated safety glass manufacture and more particularly to plastic material suitable for use as the interlayer of such a composite structure. Claims to laminated safety glass structures involving the use of our improved plastics are contained in the present application, while claims to the plastics per se are being made in a divisional application, now Patent No. 2,388,802.

In making laminated safety glass, a primary consideration is that of securing adequate adhesion between the glass and plastic laminations going to make up the structure. It is not only necessary for the glass-plastic laminations to adhere strongly to one another, but this adhesion must persist indefinitely throughout all conditions to which the structure is exposed. In addition, the laminated structure must be clear and colorless and must remain so permanently even after prolonged exposure to light and heat. A further requisite of laminated safety glass is resistance to temperature changes. The plastic lamination or laminations must remain strong and flexible at low temperatures and not be lacking in strength at elevated temperatures so that if the glass is broken, the shock will be absorbed by the structure and the fragments of glass will remain bonded to the plastic interlayer.

It is the aim of our invention to provide a laminated safety glass which possesses all of the properties of an ideal safety glass and which can be produced by the customary methods now employed in the art at a comparable if not reduced cost.

Other objects and advantages of the invention will become more apparent during the course of the following description, when taken in connection with the accompanying drawings.

In the drawings, wherein like numerals are employed to designate like parts throughout the same, the figure is a fragmentary, sectional view of a sheet of the laminated safety glass of this invention.

At the present time, most of the laminated safety glass produced commercially is made with a plastic interlayer formed of a polyvinyl acetal resin. The polyvinyl acetal resins themselves are of relatively recent development and, to date, the butyraldehyde type of polyvinyl acetal resin has been advanced further than the other polyvinyl acetal resins, for example, those made from formaldehyde and acetaldehyde. One reason for this resides in the greater ease of plasticization of the butyraldehyde type. In fact, as a result of the many experiments conducted by us, little advantage of any of the aldehydes over butyraldehyde could be found.

Therefore, in endeavoring to produce another type of resin comparable with if not superior to the present polyvinyl butyracetal resin for safety glass purposes, attempts were made by us to react partially hydrolyzed polyvinyl esters or polyvinyl alcohol with ketones. It is known that dimethyl ketone (acetone) or methyl ethyl ketone are widely used as solvents and are relatively cheap materials as compared, say, with the low molecular weight aldehydes. When an attempt is made to react a partially hydrolyzed polyvinyl ester or polyvinyl alcohol with low molecular weight ketones of an aliphatic nature under identically the same conditions used for preparing the polyvinyl acetal resins, instead of obtaining a resin in which a large proportion of the available hydroxyl groups have been replaced by the ketone, a material which is water-soluble is obtained. This indicates that under the ordinary circumstances, the ketones are less readily reactive and fail to replace the available hydroxyl groups.

We have discovered that an eminently satisfactory resin material for safety glass plastic manufacture can be obtained under special conditions by combining not only aldehyde groups but ketone groups as well with the available hydroxyl groups of the partially hydrolyzed polyvinyl ester or polyvinyl alcohol. Such resin materials may be termed "polyvinyl ketal acetal resins." However, we found that not all of the aldehyde family and ketone family could be combined to produce resins satisfactory for use as interlayers in safety glass but that, on the contrary, only certain of these aldehydes and ketones were suitable for this purpose. More particularly, therefore, our invention concerns the employment of a special group of polyvinyl ketal acetal resins in which methyl ethyl ketone and butyraldehyde are the ketone and aldehyde respectively used in the manufacture of our resin.

Obviously, thousands of polyvinyl ketal acetal resins can be made, for example, by using acetone (the simplest ketone) and reacting with formaldehyde, acealdehyde, propionaldehyde, butyraldehyde, etc. to name only a few of the aliphatic aldehydes as well as benzaldehyde and numerous other aldehydes of an aromatic nature.

Preliminary work in this field with acetone and aliphatic as well as aromatic aldehydes indicated that in order to obtain satisfactory resins, the aldehyde employed should be of high molecular weight, or poor compatibility of the resin with plasticizers as well as high water absorption inherently results. This is more or less analogous to the findings in the polyvinyl acetal field itself where really good compatibility with plasticizers is not obtained unless one employs aldehydes having at least four carbon atoms. Since good compatibility is a very desirable characteristic in the finished resin, preliminary work led to the abandonment of this field as an outstandingly promising one for laminated safety glass interlayers where the plastic would be unsealed and exposed to the atmosphere on the edges. It is not to be inferred that ketal acetal resins made from acetone and aliphatic as well as aromatic aldehydes would not be satisfactory for other purposes, but in the safety glass field where extremely high boiling point plasticizers are to be used, compatibility and water absorption are extremely important factors.

It was therefore decided to explore the field of ketal acetal resins where methyl ethyl ketone would be employed as one of the reacting materials. Methyl ethyl ketone, which is the next most simple aliphatic ketone, is a relatively cheap material and it is to be noted contains four carbon atoms instead of the three found in acetone. Again, as in the case of acetone, thousands of resins can be made by reacting a partially hydrolyzed polyvinyl ester or polyvinyl alcohol with methyl ethyl ketone and varying the aldehyde to be employed in conjunction therewith.

There is described in the literature a method for making mixed resins of the ketal acetal type, which comprises dissolving a polyvinyl ester in alcoholic hydrochloric acid, allowing the mixture to stand until hydrolysis of the polyvinyl ester has been carried to any desired extent, and then adding to the mixture a ketone; then allowing the mixture to stand a further period of time, and then adding an aldehyde; again allowing to stand and then finally precipitating in water, followed by suitable washing operations to remove the acid catalyst. If this procedure is employed, depending upon reaction conditions such as concentration of catalyst, mole ratio of ketone and aldehyde to polyvinyl ester, reaction time and temperature, resins of varying composition are obtained. It should be noted at this point, however, that if there is added to the partially hydrolyzed polyvinyl ester in alcoholic HCl, a large excess of ketone, and allowed to stand an indefinite period of time, attempted precipitation with water at this stage leads to water soluble resins. In other words, aldehyde apparently must be present and, being more reactive than the ketone, carries a combined acetalization and ketalization to the point where one obtains water insoluble resinous materials.

In the course of our investigation, we have discovered a new method for preparing polyvinyl acetal ketal resins, which method forms the basis of a separate application for patent and is therefore not a part of the present invention per se. Based upon our experiments, however, this method is superior to that outlined in the paragraph immediately preceding and offers other advantages. Some of the resins which we prepared and found satisfactory for safety glass interlayers were made by this method and, therefore, a brief description of the method is outlined below.

A polyvinyl acetal resin of suitable properties is dissolved in alcohol or a mixture of alcohol and some other solvent found suitable for dissolving the resin in question. Alcoholic hydrochloric acid is then added and the solution allowed to stand until the product of this reaction reaches the water soluble stage. This is ascertained by periodically removing samples of the mixture and diluting with water. When the water soluble stage has been attained, the desired ketone is then added and the mixture allowed to stand over a definite period of time at room temperature. Following this step, the desired aldehyde may be added and the solution again allowed to stand. The finished resin is then obtained by precipitation in water, followed by thorough washing to remove the acid catalyst. The material is then dried and ready for use.

Hereinafter we shall outline the detailed procedures used for the preparation of a number of polyvinyl ketal acetal resins which we have investigated for safety glass interlayers. Resins were prepared from methyl ethyl ketone, partially hydrolyzed polyvinyl acetate or polyvinyl alcohol with (1) formaldehyde, (2) acetaldehyde, and (3) butyraldehyde. Other aldehydes than those mentioned were also investigated and found to behave in a similar manner but were not explored to any great extent due to the fact that they are higher priced and might be therefore impractical at the present moment for actual production of resins.

Our work shows that when formaldehyde and methyl ethyl ketone are reacted with partially hydrolyzed polyvinyl acetate or polyvinyl alcohol, resins are obtained which do not have good compatibility unless an extremely high ratio of the ketone to the aldehyde can be obtained in the finished resin. This is a very difficult thing to accomplish because of the discrepancy in the reaction tendency of the methyl ethyl ketone and the formaldehyde. Consequently, while the resins made in this manner offer good possibilities in other fields, they are relatively less desirable than the present polyvinyl butyracetal resin for safety glass purposes.

Likewise, when methyl ethyl ketone and acetaldehyde are reacted with partially hydrolyzed polyvinyl acetate or polyvinyl alcohol, resins are obtained which again, although compatible with plasticizers such as dimethyl and diethyl phthalates, are relatively incompatible with extremely high boiling point plasticizers like triethylene glycol dihexoate (3GH) or dibutyl sebacate. We found that even when the vinyl alcohol content of the resin had been reduced to 20%, the resins were still incompatible with dibutyl sebacate and if reaction is conducted to a point where only 10% of vinyl alcohol is found in the finished resin, that the resins begin to lack satisfactory adhesive qualities toward glass and are so soft that they are lacking in necessary strength properties to make good safety glass interlayers. It was likewise found that methyl ethyl ketone acetaldehyde polyvinyl resins had rather higher water absorbing characteristics (even when water insoluble) than the polyvinyl butyracetal resin now used.

When experiments were conducted by reacting methyl ethyl ketone with n-butyraldehyde and partially hydrolyzed polyvinyl acetate, or polyvinyl alcohol, according to our new method described above, resins with outstandingly good characteristics for safety glass interlayers could be obtained. However, in order to produce such resins, a very large amount of experimental work had to be conducted to ascertain what conditions had to be employed to give a resin of satisfactory composition. To illustrate, the reaction may be carried on under such conditions that water soluble materials are obtained or water insoluble resins may be obtained which are of poor compatibility with plasticizers. Likewise, conditions may also be chosen which will produce resins that are too soft and lacking in strength properties for safety glass interlayers.

As a result of a thorough investigation of the reaction among these three materials, besides careful analyses of the products obtained from a large number of reactions, several factors were found to be extremely important. First, and perhaps the most important factor, is the polyvinyl alcohol content of the finished resin. If the polyvinyl alcohol of the finished resin ranges from 10 to 28 percent, resins of good compatibility with high boiling plasticizers, such as triethylene glycol dihexoate (3GH) and dibutyl sebacate, are obtained. If, on the other hand, the polyvinyl alcohol content is below 10%, resins lacking in adhesion to glass are obtained and are found to be extremely soft and, even though tightly adhered to the glass, result in laminations which are relatively weak as measured by standard impact tests. On the other hand, if the polyvinyl alcohol content of the resin is above 28% and say below 50%, water insoluble resins are obtained in some cases. However, these materials are lacking in compatibility with plasticizers and are therefore useless as bases for the manufacture of safety glass plastic interlayers. Above 50% polyvinyl alcohol content, most of the resins are water soluble and consequently not useful for safety glass manufacture.

Another factor influencing the desirability of the methyl ethyl ketone aldehyde polyvinyl resins is the ketal acetal ratio which is arrived at by determining the amount of ketone groups reacted with the hydroxyl groups of the resin by a method hereinafter described, and likewise determining the amount of aldehyde groups reacted with the hydroxyl groups of the resin by a method also hereinafter described, and then dividing one by the other. Where the lower aldehydes were employed and reacted with the methyl ethyl ketone and the polyvinyl alcohol or partially hydrolyzed polyvinyl ester, it was found that the ketal acetal ratio was of considerable importance. In general, the higher the ratio the better the results from the standpoint of safety glass interlayer use.

In the case of the butyraldehyde methyl ethyl ketone polyvinyl resins, this ratio was found to be also important. The molecular weights of the butyraldehyde (72) and the methyl ethyl ketone (72) are of course identical. Attempts were made to increase the ratio of ketal to acetal, since by so doing cheapening of the resin would occur, methyl ethyl ketone being a cheaper material than butyraldehyde. However, as previously pointed out, the relative reactivity of the two materials favors the aldehyde and, in general, ratios of ketal to acetal greater than from two to three were never obtained where the polyvinyl alcohol content of the resin ranged from 10 to 28 percent. In fact, we found that when the ratio of ketal to acetal exceeded 3.25 to 1, the resin was definitely unsatisfactory for laminated safety glass manufacture.

Given below is a series of experiments detailing the method of preparation of a number of the resins prepared and investigated. In each instance, the exact reaction conditions used for preparing the resin are outlined and an analysis of the finished resin tabulated; in those instances where analyses were not deemed necessary, for example where a resin was water soluble and of no interest, its analysis is omitted. Before giving the details of the methods used for preparing the resins of our invention, we are outlining below pertinent data regarding analytical methods employed in our studies.

Our studies show that the viscosity of the polyvinyl esters, polyvinyl alcohol or polyvinyl acetal resins employed in the preparation of our new resin, is important. Where our resins are made from polyvinyl acetate directly, the viscosity is measured by dissolving the polyvinyl ester in benzene and the figures given below in our preparations denote the viscosity measured in centipoises of a molar solution of the polyvinyl ester in benzene at 60° F. Where we employ polyvinyl acetal resins as the starting product, the viscosity of the polyvinyl acetate from which the polyvinyl acetal resin was prepared by hydrolysis and acetalization is given and again the viscosity is expressed as that of a molar solution in benzene at 60° F. As is well understood in the art, the viscosity of the polyvinyl ester is the governing factor in determining the viscosity of a polyvinyl alcohol resulting from hydrolysis thereof, or a polyvinyl acetal resin made by hydrolyzing the polyvinyl ester and then acetalizing to obtain the polyvinyl acetal. We have established that resins made from polyvinyl esters having viscosities less than 7 centipoises, when measured in molar solutions of benzene at 60° F., lead to final products that are unduly brittle and, therefore, unsatisfactory for safety glass interlayers.

In analyzing our finished products, the vinyl alcohol content of the resins is determined by the following method:

Place 1.000 gram of the dried resin in a clean and dry citrate of magnesia-type Pyrex pressure bottle and add carefully from a pipette 25 cc. of acetic anhydride-pyridine reagent (12% by volume of acetic anhydride in dry and colorless pyridine). Cap the bottle with an ordinary bottle cap lined with silver foil. Use a pressure capper so as to prevent leaks. Place the bottle in a water bath or on a steam plate and heat for two hours; the bottle should be shaken occasionally till the resin is completely in solution. Cool and add dropwise 2 to 3 cc. of distilled water while shaking gently and then let stand at room temperature for a few minutes to allow the acetic anhydride to decompose. Wash down the cap and the mouth of the bottle with 25 cc. of ethylene dichloride and then add from a pipette 100 cc. of 0.5 N alkali solution while shaking the bottle during the addition. Finish the titration with standardized 0.5 N alkali solution using phenolphthalein (use ½ cc.) as an indicator; shake vigorously when reaching the end point, which is a permanent faint pink. A blank must be run.

$$\frac{\left(\frac{\text{Cc. NaOH}}{\text{for blank}} - \frac{\text{cc. NaOH}}{\text{for sample}}\right) \times \text{normality of NaOH} \times .04403}{\text{Weight of sample}} \times 100 = \% \text{ vinyl alcohol}$$

In determining the polyvinyl acetate content of our finished resins, the method outlined below is employed:

Place 1.000 gram of the dried resin in a clean and dry citrate of magnesia-type Pyrex pressure bottle and add from a pipette 50 cc. of methanol-butanol solution (5 methanol to 1 butanol) in such a way as to wash down the sides of the bottle. From a burette add exactly 10 cc. of .15 N NaOH. Cap the bottle with an ordinary pressure bottle cap lined with silver foil. Use a capper so as to prevent leaks. Heat the mixture either in a water bath or on a steam plate for two hours. Without cooling, dilute with 50 cc. of butyl alcohol and add from a burette 10 cc. of .2 N H₂SO₄ solution; recap and heat for an additional 30 to 45 minutes. Cool and titrate with .15 N NaOH solution, using bromthymol blue as an indicator. A blank must be run.

$$\frac{\text{Cc. NaOH} - \text{cc. NaOH} \times \text{normality} \times .08605}{\text{Weight of sample}} \times 100 = \% \text{ vinyl acetate}$$

Our studies show that resins having a polyvinyl acetate content of more than 5% are less satisfactory for safety glass interlayers than those having a lower polyvinyl acetate content.

In order to arrive at the polyvinyl acetal content of the resins, we adopted the following procedure:

DETERMINATION OF POLYVINYL ACETAL IN POLYVINYL ACETAL KETAL RESINS

*Principle*

Digestion in phosphoric acid followed by distillation and determination of aldehyde by reduction of AgNO₃.

*Apparatus*

A Claisen flask of 500 cc. capacity, with the main neck shortened so as to eliminate dead air space, is connected with an extra long water condenser fitted (tightly) with an adapter. The adapter is long enough to reach the bottom of the distillate flask, preferably a 1 liter glass stoppered bottle. Rubber stoppers are used at all connections. A dropping funnel is connected to the shortened main neck and is used to add the phosphoric acid and water during the digestion and distillation.

*Solutions*

Phosphoric acid _____ 40–45%
Ammonium hydroxide _____ Conc.
Sodium hydroxide solution _____ Normal
Silver nitrate _____ One-half normal

*Digestion*

A .25–.50 gram sample of the dried resin is weighed into the Claisen flask and 100 cc. of phosphoric acid (40–45%) added. The apparatus is connected and 50 cc. of distilled water placed in the receiver so that the end of the adapter is below the water. The receiver is immersed in an ice bath and all precautions are used to prevent the escape of aldehyde. Heat is applied slowly so that when the resin dissolves, the solution will be clear and dark amber in color. Some distillation will take place while resin is dissolving and water should be added through the dropping funnel to compensate for this. After resin dissolves, the solution is distilled at a rate that will give a 500 cc. distillate in approximately 1 hour, water being added through the dropping funnel at the same rate.

*Determination*

The distillate is weighed and aliquot portions are used. These portions are placed in pressure bottles and to each 110 cc. of solution in said pressure bottles, 25 cc. conc. NH₄OH and 9 cc. N NaOH solution are added. Silver nitrate solution in 100% excess is added, the bottles sealed and heated in the dark for 10 hours at 100° C. A blank must be run simultaneously using distilled water collected under same conditions as that of the aldehyde solution. The silver content of both blank and sample is determined by any of the standard methods.

*Calculations*

$$\frac{\frac{\text{Wt. of AgCl}}{\text{in blank}} - \frac{\text{Wt. of AgCl}}{\text{in sample}} \times 100 \times \frac{\text{mol. wt. of}}{\text{polyvinyl acetal}}}{\text{Sample Wt.} \times 286} = \% \text{ polyvinyl acetal}$$

DETERMINATION OF POLYVINYL KETAL IN POLYVINYL KETAL ACETAL RESINS

*Principle*

Digestion in phosphoric acid and distillation followed by determination of ketone by iodoform method. Obviously, this method is applicable only to those ketones which form iodoform. Aldehydes which form iodoform interfere.

*Apparatus*

The same as that described under the determination of polyvinyl acetal in polyvinyl acetal ketal resins.

*Solutions*

Phosphoric acid, 40–45%
NaOH solution, 108 grams per 300 cc.
1/10 N iodine in KI solution
Concentrated HCl
1/10 N sodium thiosulfate

*Digestion*

A .25 gram sample of the dried resin is weighed into the Claisen flask and 100 cc. of phosphoric acid (40–45%) added. The apparatus is connected and 50 cc. of distilled water placed in the receiver so that the end of the adapter is below the water. The receiver is immersed in an ice bath and all precautions are used to prevent the escape of ketone. Heat is applied slowly so that when the resin dissolves the solution will be clear and dark amber in color. Some distillation will take place while resin is dissolving and water should be added through the dropping funnel to compensate for this. After resin dissolves, the solution is distilled at a rate that will give a 350 cc. distillate in approximately one hour, water being added through the dropping funnel at the same rate.

*Determination*

The distillate is weighed and conc. NaOH is added (11 cc. for every 100 cc. of distillate), followed by 50 cc. of 1/10 N iodine solution. The mixture is allowed to stand 15 minutes. At this point the iodoform is usually precipitated. The solution is then acidified with conc. HCl (cooling in ice bath) until all the iodine is liberated. The liberated iodine is then titrated with standard 1/10 N sodium thiosulfate.

*Calculations*

$$\frac{\frac{\text{Cc. thiosulfate}}{\text{for blank}} - \frac{\text{cc. thiosulfate}}{\text{for sample}} \times \frac{\text{normality of}}{\text{thiosulfate}} \times \frac{\text{mol. wt. of}}{\text{polyvinyl ketal}}}{1000 \times \text{sample Wt.} \times 6} \times 100 =$$
% polyvinyl ketal DETERMINATION OF SUM OF KETAL AND ACETAL CONTENT IN POLYVINYL ACETAL KETAL RESINS

*Principle*

Sum of ketal and acetal contents obtained by digestion in phosphoric acid, followed by distillation and determination by means of NaHSO₃.

*Apparatus*

The same as that described under the determination of polyvinyl acetal in polyvinyl acetal ketal resins.

Solutions

Phosphoric acid, 40–45%
NaHSO₃, 5.2 grams per 100 cc. H₂O
1/10 N iodine solution
1/20 N sodium thiosulfate solution
1% starch solution

Digestion

Sample weight should be .6 to 1 gram. The digestion and distillation are carried out as explained in the determination of polyvinyl ketal in polyvinyl ketal acetal resins. 500 cc. of distillate are collected. Both ketal alone or ketal-acetal together may be determined with this one distillation.

Titration

For combined acetal and ketal, pipette a 50 cc. portion of the distillate into a 100 cc. volume flask. Add, with pipette, 10 cc. of bisulfite solution, and then dilute to mark with distilled water. Let stand one hour. A 50 cc. portion is then pipetted into a flask containing 50 cc. of 1/10 N iodine solution and 5 cc. of 50% acetic acid. The excess iodine is titrated immediately with 1/20 N sodium thiosulfate to a starch end point. A blank, using distilled water in place of distillate, must be run simultaneously.

Calculations

A $$\frac{\text{Cc. thiosulfate} - \text{cc. thiosulfate} \times \text{normality} \times \text{volume of} \times 2}{\text{for sample} - \text{for blank} \times \text{thiosulfate} \times \text{distillate} \times 2} =$$
$$\frac{}{1000 \times \text{sample Wt.} \times 50 \times 2} =$$

total moles of carbonyl groups (or equivalents)

B (Equivalent of polyvinyl ketal can be determined on 100 cc. portions of the 500 cc. distillate. The procedure is the same as that described under the polyvinyl ketal analysis.)

$$\frac{\text{Cc. thiosulfate} - \text{cc. thiosulfate} \times \text{normality} \times \text{volume of}}{\text{for blank} - \text{for sample} \times \text{thiosulfate} \times \text{distillate}}$$
$$\frac{}{1000 \times \text{sample Wt.} \times 100 \times 6} =$$

equivalents corresponding to polyvinyl ketal

Therefore: $A-B$=equivalents corresponding to polyvinyl acetal. Since the bisulfite reaction is only 90% complete, the Per cent of polyvinyl acetal $= \frac{A-B}{.9} \times$ mol. wt. of polyvinyl acetal The percent of polyvinyl ketal $= B \times$ mol. wt. of polyvinyl ketal.

EXAMPLE NO. 1.—POLYVINYL ACETAL KETAL RESIN FROM FORMALDEHYDE AND METHYL ETHYL KETONE

Preparation 135 grams of polyvinyl acetal resin* which was made by reacting a partially hydrolyzed polyvinyl acetate of viscosity 15 centipoises (molar benzene solution at 60° F.) with formaldehyde was dissolved in 1000 cc. of ethylene dichloride. 360 cc. of methyl ethyl ketone was added followed by immediate addition of 100 cc. of methenolic hydrochloric acid (4.6 normal). The mixture was then allowed to stand for 6 hours. At the end of this period of time, the ethylene dichloride was removed by distillation and the resulting residue diluted with water and the precipitated product filtered off, washed free of acid catalyst and then dried.

Analysis

| | Per cent |
|---|---|
| Polyvinyl alcohol | 18.8 |
| Polyvinyl acetate | 7.5 |

Properties

This resin when plasticized with 50 parts of dimethyl phthalate per 100 parts of resin gave a transparent sheet which was inelastic and hard. With 50 parts of dimethyl sebacate, dibutyl phthalate and dibutyl sebacate, the resin was incompatible. In the case of the dimethyl sebacate, a plastic sheet was obtained but the plasticizer exuded rapidly.

The resin was unsatisfactory for safety glass.

Analysis*

| | Per cent |
|---|---|
| Polyvinyl formal | 82 |
| Polyvinyl alcohol | 8.7 |
| Polyvinyl acetate | 9.2 |

EXAMPLE NO. 2.—POLYVINYL ACETAL KETAL RESIN FROM FORMALDEHYDE AND METHYL ETHYL KETONE

Preparation 135 grams of polyvinyl acetal resin* which was made by reacting a partially hydrolyzed polyvinyl acetate of viscosity 15 centipoises (molar benzene solution at 60° F.) with formaldehyde was dissolved in 1000 cc. of ethylene dichloride. 360 cc. of methyl ethyl ketone was added followed by immediate addition of 100 cc. of methanolic hydrochloric acid (4.6 normal). The mixture was then allowed to stand for 15 hours. At the end of this period of time, the ethylene dichloride was removed by distillation and the resulting residue diluted with water and the precipitated product filtered off, washed free of acid catalyst and then dried.

Analysis

| | Per cent |
|---|---|
| Polyvinyl alcohol | 13.8 |
| Polyvinyl acetate | 7.35 |

Properties

While this resin material when plasticized with 50 parts of dimethyl phthalate to 100 parts of resin gave a transparent sheeting, the material was found to be inelastic. Plasticized with 50 parts of dimethyl sebacate, a sheet was obtained which sweated out badly. The resin was found to be incompatible with dibutyl phthalate and dibutyl sebacate.

This resin material did not yield a satisfactory safety glass interlayer.

Analysis*

| | Per cent |
|---|---|
| Polyvinyl formal | 82 |
| Polyvinyl alcohol | 8.7 |
| Polyvinyl acetate | 9.2 |

EXAMPLE NO. 3.—POLYVINYL ACETAL KETAL RESIN FROM FORMALDEHYDE AND METHYL ETHYL KETONE

Preparation 135 grams of polyvinyl acetal resin* which was made by reacting a partially hydrolyzed polyvinyl acetate of viscosity 15 centipoises (molar benzene solution at 60° F.) with formaldehyde was dissolved in 1000 cc. of ethylene dichloride. 360 cc. of methyl ethyl ketone was added followed by immediate addition of 100 cc. of methanolic hydrochloric acid (4.6 normal). The mixture was then allowed to stand for 24 hours. At the end of this period of time, the ethylene dichloride was removed by distillation and the re-sulting residue diluted with water and the precipitated product filtered off, washed free of acid catalyst and then dried.

Analysis

| | Per cent |
|---|---|
| Polyvinyl alcohol | 24.0 |
| Polyvinyl acetate | 6.05 |

Properties

When plasticized with 50 parts of dimethyl phthalate to 100 parts of resin, a hard horny sheet was obtained. The resin was incompatible with dibutyl phthalate, dimethyl sebacate and dibutyl sebacate.

This resin did not yield a satisfactory safety glass interlayer.

Analysis*

| | Per cent |
|---|---|
| Polyvinyl formal | 82 |
| Polyvinyl alcohol | 8.7 |
| Polyvinyl acetate | 9.2 |

EXAMPLE No. 4.—POLYVINYL ACETAL KETAL RESIN FROM ACETALDEHYDE AND METHYL ETHYL KETONE

Preparation 135 grams of polyvinyl acetal resin* which was made by reacting a partially hydrolyzed polyvinyl acetate with acetaldehyde (viscosity of the polyvinyl acetate being 15 centipoises in molar benzene solution at 60° F.) was dissolved in 1000 cc. of methanol. 360 cc. of methyl ethyl ketone was added and immediately was also added 400 cc. of methanolic HCl (2.75 normal). The mixture was allowed to stand for 24 hours, and then poured into water with vigorous stirring. Much frothing was observed and no precipitate formed, proving the resin to be water soluble.

Analysis

No analysis was made because the product was water soluble.

Properties

Obviously, the water solubility of the resin made it unsatisfactory for safety glass and experimentation shows that such water soluble resins are incompatible with high boiling point plasticizers such as dibutyl sebacate.

Analysis*

| | Per cent |
|---|---|
| Polyvinyl alcohol | 9.49 |
| Polyvinyl acetal | 57.8 |
| Polyvinyl acetate | 29.2 |

EXAMPLE No. 5.—POLYVINYL ACETAL KETAL RESIN FROM ACETALDEHYDE AND METHYL ETHYL KETONE

Preparation 135 grams of polyvinyl acetal resin* which was made by reacting a partially hydrolyzed polyvinyl acetate with acetaldehyde (viscosity of the polyvinyl acetate being 15 centipoises in molar benzene solution at 60° F.) was dissolved in 1000 cc. of methanol. 360 cc. of methyl ethyl ketone was added and immediately was also added 400 cc. of methanolic HCl (2.75 normal). The mixture was allowed to stand for 6 hours, then poured into water, and it was found that hot water was necessary to precipitate the resin. After washing with hot water to remove acid catalyst, the material was air dried.

Analysis

| | Per cent |
|---|---|
| Polyvinyl alcohol | 34.5 |
| Polyvinyl acetate | 8.6 |

Due to the fact that the resin had such high water solubility, a complete analysis was deemed unnecessary.

Properties

This resin was found to be somewhat soluble in cold water less so in hot water. It formed a thin gel with methanol. Its compatibility with high boiling point plasticizers was found to be unsatisfactory, making it unsuitable for safety glass use.

Analysis*

| | Per cent |
|---|---|
| Polyvinyl alcohol | 9.49 |
| Polyvinyl acetal | 57.8 |
| Polyvinyl acetate | 29.2 |

EXAMPLE No. 6.—POLYVINYL ACETAL KETAL RESIN FROM ACETALDEHYDE AND METHYL ETHYL KETONE

Preparation 67 grams of a polyvinyl acetal resin of the same type described, used for the preparation of the resin in Examples 4 and 5, was dissolved in 500 cc. of methanol. To this solution was added 180 cc. of methyl ethyl ketone and 200 cc. of methanolic HCl (2.75 normal). The mixture was allowed to stand for 48 hours, and then poured into water. The material precipitated but readily redissolved in the water. Precipitated in other solvents it was found to be water soluble.

Analysis

No analysis made due to high water solubility.

Properties

Resin unsatisfactory for safety glass interlayers.

EXAMPLE No. 7.—POLYVINYL ACETAL KETAL RESIN FROM ACETALDEHYDE AND METHYL ETHYL KETONE

Preparation 135 grams of a polyvinyl acetal resin of the same analysis as that employed for making the resin in Examples 4, 5 and 6 was dissolved in 1000 cc. of methanol. 400 cc. of methanolic HCl (2.5 normal) was then added and the solution allowed to stand until the reaction product became water soluble. This point was ascertained by periodically removing samples of the product and testing for water solubility. The time necessary to reach this stage was approximately 3 hours. At this juncture 300 cc. of methyl ethyl ketone was added and the mixture allowed to stand for 3½ hours. Then 250 cc. of acetaldehyde was added and again the mixture allowed to stand for 16 hours. The product of this reaction at this point was recovered by pouring the solution into water with vigorous stirring; it was then washed free of acid catalyst with water and dried.

Analysis

| | Per cent |
|---|---|
| Polyvinyl alcohol | 29.7 |
| Polyvinyl acetate | 1.8 |

A complete analysis was not made on this resin since it was found unsatisfactory for safety glass.

Properties

When plasticized in the usual way on heated rolls using 100 parts of the resin to 40 parts of dibutyl sebacate, it was found that the dibutyl sebacate was not compatible with the resin, that is to say the plastic sheeting underwent exudation. With dimethyl sebacate, a stiff inelastic plastic sheet was formed by compounding 100 parts of the resin with 40 parts of dimethyl sebacate on heated rolls followed by calendering. Plastic made using 100 parts of the resin to 40 parts of dimethyl phthalate was found to be hard and horny while plastics made with a similar quantity of dibutyl phthalate underwent exudation. The resin was found to be slightly water soluble, and unsatisfactory for safety glass interlayers due to its brittleness and non-compatibility.

EXAMPLE No. 8.—POLYVINYL ACETAL KETAL RESIN FROM ACETALDEHYDE AND METHYL ETHYL KETONE

*Preparation*

135 grams of polyvinyl acetal resin of the same type used for the preparation of the resin in Examples 4, 5, 6 and 7 was dissolved in 1000 cc. of methanol. 400 cc. of methanolic HCl (2.5 normal) was added and the solution allowed to stand until the product was proved to be water soluble by periodic removal of samples and solution in water. The period of time required to reach this stage was about 3 hours. 360 cc. of methyl ethyl ketone was added and the mixture then allowed to stand for 16 hours. 200 cc. of acetaldehyde was then added and the solution allowed to stand an additional hour. The resinous product was recovered by pouring the mixture into water with vigorous stirring followed by filtration and washing to remove acid catalyst; it was then air dried.

*Analysis*

| | Per cent |
|---|---|
| Polyvinyl alcohol | 20.9 |
| Acetate | .8 |

*Properties*

Plastic sheetings were made by compounding 100 parts of this resin with 40 parts of dibutyl sebacate, dimethyl sebacate, dimethyl phthalate and dibutyl phthalate respectively. In the case of the plastic sheeting made with dibutyl sebacate, it was found to be hard and inelastic and as well underwent exudation. The sheeting made with dimethyl sebacate was stiff, brittle and inelastic. The sheeting made with dimethyl phthalate was also stiff and inelastic. In the case of the sheeting made with dibutyl phthalate, it was likewise brittle and inelastic. None of these four types of sheeting were satisfactory for laminated safety glass interlayers, being too brittle especially at low temperatures. It is interesting to note that although the combined acetal ketal content of the resin was approximately 80%, the resultant resin is lacking in compatibility with suitable plasticizers and unsatisfactory for safety glass.

EXAMPLE No. 9.—POLYVINYL ACETAL KETAL RESIN MADE FROM BUTYRALDEHYDE AND METHYL ETHYL KETONE

*Preparation*

688 grams of polyvinyl acetate (viscosity 45 centipoises) was dissolved in 3200 cc. of methanol. 800 cc. of methanolic HCl (4.6 normal) was then added and the mixture allowed to stand until the product of this reaction was water soluble (2½ hours). 400 cc. of methyl ethyl ketone was then added and the solution allowed to stand for 1 hour, when 240 cc. of n-butyraldehyde was added. This mixture was then allowed to stand for 13 hours. The resinous product was recovered by pouring the mixture into water, filtering, washing free of acid catalyst with water, and drying.

*Analysis*

| | |
|---|---|
| Polyvinyl alcohol | per cent 36.9 |
| Polyvinyl ketal | do 51.5 |
| Polyvinyl acetal | do 11.3 |
| Polyvinyl acetate | do .3 |
| Ratio of ketal to acetal | 4.56 |

*Properties*

When this resin was made into plastic by plasticizing 100 parts with 40 parts of dibutyl sebacate, in the usual manner, it was found that the sheeting underwent exudation or sweating out of plasticizer. It was observed that the sheeting was inelastic and rather brittle. Similar results were obtained when attempts were made to make plastic sheeting using dimethyl phthalate, dibutyl phthalate and dimethyl sebacate. While in the case of dimethyl sebacate and dimethyl phthalate, sweating out was not observed, the sheeting was inelastic and brittle. This resin, our tests show, would be unsatisfactory for a laminated safety glass interlayer and, as an examination of the analysis above given shows, in this case we have a polyvinyl alcohol content of 36.9%. A series of resins made by varying the polyvinyl alcohol content establishes that when the polyvinyl alcohol content exceeds 28%, the resins are unsatisfactory for safety glass interlayers.

EXAMPLE No. 10.—POLYVINYL ACETAL KETAL RESIN MADE FROM BUTYRALDEHYDE AND METHYL ETHYL KETONE

*Preparation*

172 grams of polyvinyl acetate (viscosity 45 centipoises) was dissolved in 800 cc. of methanol. 200 cc. of methanolic HCl (4.6 normal) then added. The mixture was then allowed to stand until the product of this reaction was water soluble (approximately 2 hours). At this point 100 cc. of methyl ethyl ketone was added and the mixture was allowed to stand for 2 hours. Then 60 cc. of n-butyraldehyde was added and the mixture allowed to stand for 15 hours. At this point additional methanol was added and the resin precipitated in water, followed by washing and drying.

*Analysis*

| | |
|---|---|
| Polyvinyl alcohol | per cent 35.9 |
| Polyvinyl acetate | do .9 |
| Polyvinyl ketal | do 49.7 |
| Polyvinyl acetal | do 13.48 |
| Ratio of ketal to acetal | 3.6 |

*Properties*

This resin was found to be compatible with dimethyl phthalate but gave a rather inelastic sheeting. With dibutyl phthalate, a stiff inelastic sheet was obtained, and with dimethyl sebacate and dibutyl sebacate, the resin was found to be on the edge of compatibility, yielding inelastic products.

The material is found after extensive testing to be unsatisfactory for safety glass interlayers.

EXAMPLE No. 11.—POLYVINYL ACETAL KETAL RESIN MADE FROM BUTYRALDEHYDE AND METHYL ETHYL KETONE

*Preparation*

172 grams of polyvinyl acetate (viscosity 45 centipoises) was dissolved in 800 cc. of methanol.

200 cc. of methanolic HCl (4.6 normal) then added. The mixture was then allowed to stand until the product of this reaction was water soluble (approximately 2 hours). At this point 100 cc. of methyl ethyl ketone was added and the mixture was allowed to stand for ½ hour. Then 200 cc. of n-butyraldehyde was added and the mixture allowed to stand for 15 hours. At this point additional methanol was added and the resin precipitated in water followed by washing and drying.

*Analysis*

| | |
|---|---|
| Polyvinyl alcohol _____ per cent__ | 8.2 |
| Polyvinyl acetate _____ do____ | 3.9 |
| Polyvinyl ketal _____ do____ | 45.44 |
| Polyvinyl acetal _____ do____ | 42.48 |
| Ratio of ketal to acetal _____ | 1.07 |

*Properties*

This resinous material was found to yield soft elastic sheetings with dimethyl phthalate, dimethyl sebacate, dibutyl phthalate and dibutyl sebacate. However, the sheeting was soft and lacking in tensile strength. At elevated temperatures, laminated glass made with this material had inadequate resistance to impact.

EXAMPLE NO. 12.—POLYVINYL ACETAL KETAL RESIN MADE FROM BUTYRALDEHYDE AND METHYL ETHYL KETONE

*Preparation*

600 grams of polyvinyl acetate of viscosity 45 centipoises was dissolved in 3000 cc. of methyl ethyl ketone and 3000 cc. of methanol. Then 1200 cc. of methanolic HCl (3.0 normal) was added and the mixture stirred for 18 hours. 1200 cc. of butyraldehyde was added at this juncture and stirring continued for 6 hours. The resin was recovered by precipitation in water in the usual manner.

*Analysis*

| | |
|---|---|
| Polyvinyl alcohol _____ per cent__ | 7.3 |
| Polyvinyl ketal _____ do____ | 40.4 |
| Polyvinyl acetal _____ do____ | 40.7 |
| Polyvinyl acetate _____ do____ | 11.6 |
| Ratio of ketal to acetal _____ | 1.00 |

*Properties*

This resin was found to be like the resin in Example 13, namely, insoluble in water and compatible with a large number of plasticizers including dimethyl sebacate, dimethyl phthalate, dibutyl sebacate and dibutyl phthalate. Sheeting made by any of the standard methods was found to be highly elastic and clear but somewhat softer than the resin in Example 13. When plasticized with 33 parts and 40 parts of dibutyl sebacate respectively to 100 parts of the resin and calendered to produce .015 inch stock, it was laminated between glass without adhesive in the standard manner. Break tests using a freely falling half-pound steel ball conducted on 12 x 12 inch laminations made from these two plastic sheetings at 0°, 70° and 120° F. gave the following results: At 0° the 33 parts stock withstood the impact of the ball 16 feet, while at 70° about 40 feet, and at 120° the laminations failed to withstand the impact of the ball falling 16 feet. The 40 parts stock at 0° withstood the impact of the half-pound ball falling 20 feet, while at 70° the laminations withstood the impact of the ball about 30 feet, and at 120° the laminations failed to withstand the impact of the ball 18 feet. It was observed that the laminated glass made from both these stocks was satisfactorily stable to ultra-violet light and weathering unsealed.

It will be observed that in this case the polyvinyl alcohol content of the resin was 7.3% and the polyvinyl acetate content 11.6%. The resultant resin, it is to be noted, is somewhat too soft and lacking in strength properties for laminated safety glass, especially at high temperatures. Investigation of a number of resins shows that when the polyvinyl acetate content greatly exceeds 5.0% and the polyvinyl alcohol content falls below 10%, such resins have unsatisfactory strength, especially at elevated temperatures, say 120° F.

EXAMPLE NO. 13.—POLYVINYL ACETAL KETAL RESIN MADE FROM BUTYRALDEHYDE AND METHYL ETHYL KETONE

*Preparation*

600 grams of polyvinyl acetate (viscosity 45 centipoises in molar benzene solution at 60° F.) was dissolved in 3000 cc. of methanol and 3000 cc. of methyl ethyl ketone was then added. 1200 cc. of methanolic HCl (3.0 normal) was added to the solution and the mixture stirred for 1¾ hours. The mixture was then allowed to stand for 97 hours and became a tough gel. At the end of this time 1350 cc. of butyraldehyde and 2000 cc. of methyl ethyl ketone were added and stirring continued for 48 hours. This treatment brought about complete solubility of the gel and at the end of this 48 hour period, the resinous product was recovered by precipitating in water. The product was recovered by filtration, washed with water to remove acid catalyst and was then dried.

*Analysis*

| | |
|---|---|
| Polyvinyl alcohol _____ per cent__ | 12.0 |
| Polyvinyl ketal _____ do____ | 54.5 |
| Polyvinyl acetal _____ do____ | 32.8 |
| Polyvinyl acetate _____ do____ | 0.7 |
| Ratio of ketal to acetal _____ | 1.66 |

*Properties*

This resin was found to possess excellent compatibility properties with dimethyl phthalate, dimethyl sebacate, dibutyl phthalate and dibutyl sebacate. Sheeting was made on hot malaxating rolls, followed by calendering, and when sheets of the plastic .015 inch in thickness made by compounding 100 parts of the resin with 33 parts of dibutyl sebacate were laminated between plates of glass without adhesive by standard laminating procedures, an excellent product was obtained. 12 x 12 inch samples of laminated safety glass made from this sheeting and impacted at 0°, 70° and 120° F. with a half-pound, freely falling, steel ball, gave the following results: The laminations at 0° withstood the impact of the ball falling through a distance of 16 to 18 feet, and at 70° the laminations withstood the mpact of the ball over 40 feet, while at 120° F the laminations withstood the impact of the ball falling through a distance of 16 to 18 feet. When 100 parts of the resin was plasticized with 40 parts of dibutyl sebacate, the resultant sheeting laminated between glass withstood the impact of the half-pound steel ball falling on a 12 x 12 inch lamination more than 20 feet at 0°, over 40 feet at 70°, and about 18 feet at 120° F.

The laminated glass made from this resin was found to possess excellent light stability as well as excellent resistance to weathering when exposed unsealed—no deterioration or let-goes could be detected on any of the edges.

EXAMPLE No. 14.—POLYVINYL ACETAL KETAL RESIN MADE FROM BUTYRALDEHYDE AND METHYL ETHYL KETONE

*Preparation*

1032 grams of polyvinyl acetate of viscosity 45 centipoises was dissolved in 4980 cc. of methanol. Then 600 cc. of methanolic HCl (7.29 normal) added and the solution allowed to stand until the product became water soluble. 366 cc. of methyl ethyl ketone was then added and at the end of 1 hour, an additional 366 cc. of methyl ethyl ketone added. The solution was allowed to stand for 3 hours. At this point 600 cc. of n-butyraldehyde was added and the resulting mixture allowed to stand for 16 hours. The resinous product was recovered by pouring the solution into water, washing with water to remove the acid catalyst and dried.

*Analysis*

| | |
|---|---|
| Polyvinyl alcohol_____per cent__ | 14.4 |
| Polyvinyl ketal_____do____ | 46.08 |
| Polyvinyl acetal_____do____ | 37.12 |
| Polyvinyl acetate_____do____ | 2.4 |
| Ratio of ketal to acetal_____ | 1.24 |

*Properties*

When 100 parts of this resin was compounded with 37 parts of dibutyl sebacate, an excellent plastic sheeting for safety glass was obtained. Laminated glass, 12 x 12 inch in size, made with this plastic sheeting without adhesive in .015 inch thicknesses, successfully withstood the impact of a half-pound steel ball falling freely; 40 to 45 feet at 70° F., 18 feet at 0° F., and 16 feet at 120° F.

This resin was found to be compatible with other plasticizers such as dimethyl phthalate, dimethyl sebacate, dibutyl phthalate, dibutyl sebacate, 3GH, etc. Like resin in Example 13, this resin was found to be water insoluble and possessed a low water absorptive power when exposed to very high relative humidities. The laminated safety glass described above made with this resin was found to possess excellent light and weathering resistance unsealed.

EXAMPLE No. 15.—POLYVINYL ACETAL KETAL RESIN MADE FROM BUTYRALDEHYDE AND METHYL ETHYL KETONE

*Preparation*

1032 grams of polyvinyl acetate (viscosity 45 centipoises) was dissolved in 4980 cc. of methanol. 600 cc. of methanolic HCl (7.92 normal) was then added and the solution allowed to stand until the product of this reaction was water soluble. This, of course, was as usual ascertained by periodic sampling of the mixture and testing for water solubility. The time required in this instance to reach this stage was 2 hours. 360 cc. of methyl ethyl ketone was then added and the solution allowed to stand 1 hour. At this time 366 cc. additional methyl ethyl ketone was added and the mixture allowed to stand 3 hours; then 600 cc. of n-butyraldehyde was added and the mixture allowed to stand for 16 hours. The resinous product was recovered by precipitation of the water, filtration, washing with water, and then drying.

*Analysis*

| | |
|---|---|
| Polyvinyl alcohol_____per cent__ | 22.2 |
| Polyvinyl ketal_____do____ | 42.9 |
| Polyvinyl acetal_____do____ | 34.1 |
| Polyvinyl acetate_____do____ | .87 |
| Ratio of ketal to acetal_____ | 1.26 |

*Properties*

This resin was found to be an outstandingly good one for laminated safety glass. It possessed excellent compatibility with the common plasticizers used in the safety glass art including dibutyl sebacate, dibutyl phthalate, dimethyl sebacate, dimethyl phthalate and 3GH. It was observed that this resin also had low water absorptive properties.

Plastic sheeting, .015 inch thickness, was made by the calendering method compounding 100 parts of this resin with 40 parts of dibutyl sebacate. The finished plastic was highly elastic and transparent and, when laminated between clean plates of glass without adhesive, in any standard manner, the 12 x 12 inch laminations impacted at 0° F. withstood the half-pound, freely falling, steel ball a distance of 18 feet. At 70° F. the 12 x 12 inch laminations withstood the impact of a half-pound, freely falling, steel ball 45 to 50 feet, while at 120° F. the laminations withstood the impact of the half-pound ball 24 feet.

Accelerated weather tests, light tests, and exposure tests on these laminations show them to possess excellent stability, proving that they can be used in commerce, unsealed.

EXAMPLE No. 16.—POLYVINYL ACETAL KETAL RESIN MADE FROM BUTYRALDEHYDE AND METHYL ETHYL KETONE

*Preparation*

792 grams of polyvinyl acetate (viscosity 45 centipoises) was dissolved in 4200 cc. of methanol. 792 cc. of methanolic HCl (2.65 normal) was then added and the solution allowed to stand until the product became water soluble (3 hours). 792 cc. of methyl ethyl ketone was then added and the solution stirred 30 minutes. 1800 cc. of methanolic HCl (2.65 normal) and 1200 cc. of methyl ethyl ketone added. On standing 18 hours, half of this mixture was treated with 600 cc. of n-butyraldehyde and stirred until the solution became complete. The resin was recovered by precipitation in water, washing and air drying.

*Analysis*

| | |
|---|---|
| Polyvinyl alcohol_____per cent__ | 18.5 |
| Polyvinyl ketal_____do____ | 51.9 |
| Polyvinyl acetal_____do____ | 24.8 |
| Polyvinyl acetate_____do____ | 4.8 |
| Ratio of ketal to acetal_____ | 2.09 |

*Properties*

This resin, like the resin in Example 15, was found to be an excellent base for making safety glass plastic interlayers. It possessed excellent compatibility with dibutyl sebacate and dibutyl phthalate. Plastic plasticized with 40 parts of dibutyl sebacate had low water absorptive properties. 12 x 12 inch laminations made by interposing .015 inch layers of plastic, made by compounding 100 parts of this resin with 40 parts of dibutyl sebacate, between clean sheets of glass, without adhesive, were tested for resistance to impact at 0°, 70° and 120° F. using the half-pound, freely falling, steel ball. At 0° the laminations withstood the impact of the half-pound steel ball 22 feet. At 70° F. about 40 feet, and at 120° F., 18 feet.

Example No. 17.—Polyvinyl Acetal Ketal Resin Made From Butyraldehyde and Methyl Ethyl Ketone

*Preparation*

172 grams of polyvinyl acetate (viscosity 45 centipoises) was dissolved in 800 cc. of methanol. 200 cc. of methanolic HCl (4.6 normal) then added. The mixture was then allowed to stand until the product of this reaction was water soluble (approximately 2 hours). At this point 100 cc. of methyl ethyl ketone was added and the mixture was allowed to stand for 1 hour. Then 60 cc. of n-butyraldehyde was added and the mixture allowed to stand for 15 hours. At this point, additional methanol was added and the resin precipitated in water followed by washing and drying.

*Analysis*

| | |
|---|---|
| Polyvinyl alcohol_____per cent__ | 17.6 |
| Polyvinyl acetate_____do____ | 1.3 |
| Polyvinyl ketal_____do____ | 44.02 |
| Polyvinyl acetal_____do____ | 37.1 |
| Ratio of ketal to acetal_____ | 1.18 |

*Properties*

This resin material was found to be compatible with dimethyl phthalate, dimethyl sebacate, dibutyl phthalate, and dibutyl sebacate, giving tough elastic transparent sheets which, when laminated between glass, gave a very satisfactory safety glass product. Impact tests showed the laminations to have good cold resistance and satisfactory resistance to impact throughout the range of 0° to 120° F. Laminated safety glass made with this material was tested for light and heat stability and found to be satisfactory. Due to the low water absorption of the resin, the laminated safety glass made using this resin as an interlayer did not require edge sealing.

It will be noted that those resins shown above (Examples 13 to 17) as being suitable for safety glass use were all made from butyraldehyde and methyl ethyl ketone, while the resins made from formaldehyde and methyl ethyl ketone and acetaldehyde and methyl ethyl ketone were found unsatisfactory for safety glass manufacture. Furthermore, it should be emphasized that not all of the resins made from butyraldehyde and methyl ethyl ketone (Examples 9 to 12) were satisfactory for use as plastic interlayers in laminated safety glass. However, we discovered that butyraldehyde and methyl ethyl ketone could be obtained to produce a resin eminently suited for use in the manufacture of laminated safety glass providing certain factors were adhered to such as the vinyl alcohol content of the resin, the vinyl acetate content of the resin, the viscosity of the polyvinyl esters or partially or wholly hydrolyzed polyvinyl esters, or polyvinyl acetal resins employed as the starting product in the preparation of our new resins, and the ratio of the ketal acetal content. In other words, our work shows that the vinyl alcohol content of the resin (calculated as polyvinyl alcohol) must fall between 10 and 28 percent; the vinyl acetate content of the resin (calculated as polyvinyl acetate) should be less than 5 percent; the viscosity of the partially or wholly hydrolyzed polyvinyl acetate used as the starting product in the preparation of our new resins should not be less than 7 centipoises in molar benzene solution at 60° F., and the ratio of ketal to acetal should preferably be not less than .5 to 1 and not exceed 3.25 to 1. Resins of the above character, having these special properties, can be suitably combined with high boiling point plasticizers and satisfactorily used as interlayers in laminated safety glass.

It will be noted in describing our resins that under the heading "Properties," comments on the plasticization of the various resins are made. Having found certain resins as indicated above (Examples 13 to 17) which were suitable for safety glass, a comprehensive study was made of the plasticization of these materials. Some plasticizers like dimethyl phthalate and diethyl phthalate, although compatible, were found to yield plastics which were too soft for safety glass interlayers or were too brittle at low temperatures when used as a safety glass interlayer. In the cases of dimethyl and diethyl phthalate, for example, when the plasticizer content was increased to a point where satisfactory impact resistance of the laminations was obtained at low temperatures, the plastic sheeting was very soft and tacky at normal temperatures and could not be handled satisfactorily in a manufacturing operation. It was likewise observed that on standing, the plastic materials made with materials such as dimethyl phthalate, diethyl phthalate and a number of other materials, gradually became harder due to loss of plasticizer by evaporation. As a result of a large amount of work, we found that esters of straight chain dicarboxylic acids containing more than four methylene groups are exceptionally good plasticizers for our new type of resins. For best results in safety glass, however, it is preferred that our new type of resin be plasticized with materials such as dibutyl sebacate, triethylene glycol dihexoate (3GH), esters made from triethylene glycol by reaction with the fatty acids of coconut oil, and as well esters made by reacting primary monohydric alcohols with the acids obtained when cresylic acid is hydrogenated and then oxidized to yield mixtures of substituted adipic acids.

After preparing the resins in the above described manner, those indicated as being suitable for safety glass plastic manufacture (Examples 13 to 17) were plasticized by adding 100 parts of resin to from 35 to 60 parts of plasticizer and worked into transparent sheeting by any of the well known accepted methods in the art. To illustrate, 100 parts of resin (Example 15) was combined with 40 parts of dibutyl sebacate and admixed thoroughly in any suitable type of mixer so that the plasticizer wets the particles of the resin. This mass was then transferred to a malaxating roll and kneaded at elevated temperatures (250 to 300 degrees F.) until the plasticizer had peptized or dissolved the resin. The mass was then made into sheet form by calendering on rolls. Instead of the calendering operation, the mass in one instance was cut into small slabs, placed in a steel mold, and pressed into cake form at elevated temperatures. The block so formed was then skived info sheets of the desired thickness (.015"). In another method, the resin and plasticizer were dissolved in denatured alcohol, using only sufficient alcohol to give a very viscous mass, and then extruded from a slot into sheet form, dried free of volatile solvents, and was ready for lamination.

In the actual manufacture of the laminated glass, the resin sheets *I* were inserted between two clean plates of glass 2, no adhesive being employed, and the sandwich so formed pressed in a platen press and subjected to a pressure of 50 pounds per square inch at 250 degrees F, for three minutes. Leaving the platen press, the laminations were introduced into an autoclave containing oil, and subjected to true hydraulic pressure at a temperature of 275 degrees F. for a period of seven minutes under a pressure of 225 pounds per square inch. Instead of resorting to the platen press, in some instances the sandwiches, for preliminary closure before autoclaving, were heated in an oven at a temperature of 250 degrees F. and then run through nipping rolls.

The finished laminated glass 3 was found to possess excellent optical characteristics, good stability to heat as measured by immersion in boiling water for a period of ten hours; found to possess excellent resistance to ultra-violet light as measured by exposure to the Uviarc for a period of 1000 hours; and found to possess excellent weathering characteristics by exposure to an accelerated weather test. One accelerated weather test cycle consisted of placing the lamination in a chest maintained at 140 degrees F. saturated with water vapor, followed by a 24 hour heating in dry air at 150 degrees F., followed by a 24 hour exposure in a refrigerator at zero degrees F. After exposure to this weather test 20 cycles, no defects along the edges of the laminations were observed, indicating that the safety glass could be used satisfactorily in commerce unsealed.

Impact tests conducted on the laminated glass made as just described show the laminated glass to possess excellent resistance to impact. For example, 12 x 12 inch laminations, maintained at zero degrees F., withstood the impact of a half-pound steel ball falling 18 feet; while the same laminations maintained at 70 degrees F. withstood the impact of a half-pound steel ball falling 45 feet; while the laminations maintained at 120 degrees F. withstood the impact of a half-pound steel ball falling 24 feet. In the above instance, the plasticizer content was 40 parts of dibutyl sebacate per 100 parts resin, and our experimental work shows that as the plasticizer content is decreased, increasingly greater resistance to impact is obtained at 70 and 120 degrees F., while if increased above 40 parts, greatly increased resistance to impact is obtained at zero degrees with an accompanying decrease in strength at the elevated temperatures of 70 and 120 degrees F.

We claim:

1. Laminated safety glass comprising two sheets of glass, and an interlayer of plastic material bonded therebetween composed of a synthetic polyvinyl ketal acetal resin made by reacting a partially or wholly hydrolyzed polyvinyl acetate (the viscosity of the polyvinyl acetate used as a starting product having a minimum viscosity of 7 centipoises in molar benzene solution at 60 degrees F.) with methyl ethyl ketone and butyraldehyde and characterized by the fact that the vinyl alcohol content of the resin (calculated as polyvinyl alcohol) ranges between 10 and 28 percent and the vinyl acetate content of the resin (calculated as polyvinyl acetate) is less than 5 percent, and a high boiling point plasticizer therefor.

2. Laminated safety glass comprising two sheets of glass, and an interlayer of plastic material bonded therebetween composed of a synthetic polyvinyl ketal acetal resin made by reacting a partially or wholly hydrolyzed polyvinyl acetate (the viscosity of the polyvinyl acetate used as a starting product having a minimum viscosity of 7 centipoises in molar benzene solution at 60 degrees F.) with methyl ethyl ketone and butyraldehyde and characterized by the fact that the vinyl alcohol content of the resin (calculated as polyvinyl alcohol) ranges between 10 and 28 percent, the vinyl acetate content of the resin (calculated as polyvinyl acetate) is less than 5 percent and the ratio of the ketal to acetal content is not less than .5 to 1 and does not exceed 3.25 to 1, and a high boiling point plasticizer therefor.

3. Laminated safety glass comprising two sheets of glass, and an interlayer of plastic material bonded therebetween composed of a synthetic polyvinyl ketal acetal resin made by reacting a partially or wholly hydrolyzed polyvinyl acetate (the viscosity of the polyvinyl acetate used as a starting product having a minimum viscosity of 7 centipoises in molar benzene solution at 60 degrees F.) with methyl ethyl ketone and butyraldehyde and characterized by the fact that the vinyl alcohol content of the resin (calculated as polyvinyl alcohol) ranges between 10 and 28 percent and the vinyl acetate content of the resin (calculated as polyvinyl acetate) is less than 5 percent, and a plasticizer therefor comprising an ester of straight chain dicarboxylic acid containing more than four methylene groups.

4. Laminated safety glass comprising two sheets of glass, and an interlayer of plastic material bonded therebetween composed of a synthetic polyvinyl ketal acetal resin made by reacting a partially or wholly hydrolyzed polyvinyl acetate (the viscosity of the polyvinyl acetate used as a starting product having a minimum viscosity of 7 centipoises in molar benzene solution at 60 degrees F.) with methyl ethyl ketone and butyraldehyde and characterized by the fact that the vinyl alcohol content of the resin (calculated as polyvinyl alcohol) ranges between 10 and 28 percent, the vinyl acetate content of the resin (calculated as polyvinyl acetate) is less than 5 percent, and the ratio of the ketal to acetal content is not less than .5 to 1 and does not exceed 3.25 to 1, and a plasticizer therefor comprising an ester of straight chain dicarboxylic acid containing more than four methylene groups.

5. Laminated safety glass comprising two sheets of glass, and an interlayer of plastic material bonded therebetween composed of a synthetic polyvinyl ketal acetal resin made by reacting a partially or wholly hydrolyzed polyvinyl acetate (the viscosity of the polyvinyl acetate used as a starting product having a minimum viscosity of 7 centipoises in molar benzene solution at 60 degrees F.) with methyl ethyl ketone and butyraldehyde and characterized by the fact that the vinyl alcohol content of the resin (calculated as polyvinyl alcohol) ranges between 10 and 28 percent and the vinyl acetate content of the resin (calculated as polyvinyl acetate) is less than 5 percent, and a plasticizer therefor comprising dibutyl sebacate.

6. Laminated safety glass comprising two sheets of glass, and an interlayer of plastic material bonded therebetween composed of a synthetic polyvinyl ketal acetal resin made by reacting a partially or wholly hydrolyzed polyvinyl acetate (the viscosity of the polyvinyl acetate used as a starting product having a minimum viscosity of 7 centipoises in molar benzene solution at 60 degrees F.) with methyl ethyl ketone and butyraldehyde and characterized by the fact that the vinyl alcohol content of the resin (calculated as polyvinyl alcohol) ranges between 10 and 28 percent, the vinyl acetate content of the resin (calculated as polyvinyl acetate) is less than 5 percent and the ratio of the ketal to acetal content is not less than .5 to 1 and does not exceed 3.25 to 1, and a plasticizer therefor comprising dibutyl sebacate.

7. Laminated safety glass comprising two sheets of glass, and an interlayer of plastic material bonded therebetween composed of a synthetic polyvinyl ketal acetal resin made by reacting a partially or wholly hydrolyzed polyvinyl acetate (the viscosity of the polyvinyl acetate used as a starting product having a minimum viscosity of 7 centipoises in molar benzene solution at 60 degrees F.) with methyl ethyl ketone and butyraldehyde and characterized by the fact that the vinyl alcohol content of the resin (calculated as polyvinyl alcohol) ranges between 10 and 28 percent and the vinyl acetate content of the resin (calculated as polyvinyl acetate) is less than 5 percent, and a plasticizer therfor comprising triethylene glycol dihexoate.

8. Laminated safety glass comprising two sheets of glass, and an interlayer of plastic material bonded therebetween composed of a synthetic polyvinyl ketal acetal resin made by reacting a partially or wholly hydrolyzed polyvinyl acetate (the viscosity of the polyvinyl acetate used as a starting product having a minimum viscosity of 7 centipoises in molar benzene solution at 60 degrees F.) with methyl ethyl ketone and butyraldehyde and characterized by the fact that the vinyl alcohol content of the resin (calculated as polyvinyl alcohol) ranges between 10 and 28 percent, the vinyl acetate content of the resin (calculated as polyvinyl acetate) is less than 5 percent and the ratio of the ketal to acetal content is not less than .5 to 1 and does not exceed 3.25 to 1, and a plasticizer therefor comprising triethylene glycol dihexoate.

JOSEPH D. RYAN.
FRED B. SHAW, Jr.

REFERENCES CITED

The following references are of record in the file of this patent:

UNITED STATES PATENTS

| Number | Name | Date |
|---|---|---|
| 2,232,806 | Ryan | Feb. 25, 1941 |
| 2,184,426 | Kocher et al. | Dec. 26, 1939 |
| 2,274,672 | Dennison | Mar. 3, 1942 |
| 2,388,802 | Ryan et al. | Nov. 13, 1945 |
| 2,117,827 | Smith | May 17, 1938 |
| 2,079,701 | Dennison | May 11, 1937 |
| 2,120,628 | Reid | June 14, 1938 |
| 2,227,975 | Kenyon et al. | Jan. 7, 1941 |
| 2,045,130 | Fix | June 23, 1936 |
| 2,242,019 | Weihe | May 13, 1941 |
| 2,120,934 | Groff | June 14, 1938 |